US012576466B2

(12) United States Patent
Wolf et al.

(10) Patent No.: US 12,576,466 B2
(45) Date of Patent: Mar. 17, 2026

(54) METHOD FOR TRANSPORTING WORKPIECE PARTS

(71) Applicant: TRUMPF WERKZEUGMASCHINEN SE + CO. KG, Ditzingen (DE)

(72) Inventors: Dennis Wolf, Heimsheim (DE); Florian Raichle, Backnang (DE); Frederick Koepp, Muenchingen (DE); Joachim Wipper, Ditzingen (DE); Bernd Ruediger Schwald, Stuttgart (DE); Lena Dasch, Stuttgart (DE); Synnoeve Engel, Bietigheim-Bissingen (DE); Felix Frank, Leonberg (DE); Ulrich Gommel, Weissach (DE); Steffen Rauscher, Dettingen unter Teck (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 1101 days.

(21) Appl. No.: 17/624,959

(22) PCT Filed: Jun. 25, 2020

(86) PCT No.: PCT/EP2020/067844
§ 371 (c)(1),
(2) Date: Jan. 5, 2022

(87) PCT Pub. No.: WO2021/004801
PCT Pub. Date: Jan. 14, 2021

(65) Prior Publication Data
US 2022/0288727 A1 Sep. 15, 2022

(30) Foreign Application Priority Data
Jul. 5, 2019 (DE) ..................... 10 2019 209 923.8

(51) Int. Cl.
*B23K 37/04* (2006.01)
*B23K 26/38* (2014.01)
*B23K 101/18* (2006.01)

(52) U.S. Cl.
CPC .......... *B23K 37/0408* (2013.01); *B23K 26/38* (2013.01); *B23K 2101/18* (2018.08)

(58) Field of Classification Search
CPC ............... B23K 2101/18; B23K 26/38; B23K 37/0408; B23K 37/047
(Continued)

(56) References Cited

U.S. PATENT DOCUMENTS 9,700,962 B2 * 7/2017 Yang ....................... B23K 26/38
9,713,858 B2 7/2017 Yang et al.
(Continued)

FOREIGN PATENT DOCUMENTS

DE 112014002188 T5 1/2016
DE 112014002190 T5 1/2016
(Continued)

*Primary Examiner* — Ibrahime A Abraham
*Assistant Examiner* — Joseph W Iskra
(74) *Attorney, Agent, or Firm* — Laurence A. Greenberg; Werner H. Stemer; Ralph E. Locher

(57) ABSTRACT

A method for transporting workpiece parts out of a cutting area of a laser cutting machine includes: moving a first holding device for holding workpiece parts along a first guide in a transporting direction transverse to a direction of movement of a laser cutting head, and moving a second holding device along a second guide in the transporting direction transverse to the direction of movement of the laser cutting head. First workpiece parts, which are cut within the cutting area from a first half of a workpiece, are transported from the cutting area into the storage area by the first holding device. Second workpiece parts, which are cut within the cutting area from a second half of the workpiece, are transported from the cutting area into storage area by the (Continued)

second holding device. The transportation of the first and second workpiece parts takes place in alternation.

14 Claims, 2 Drawing Sheets

(58) Field of Classification Search
USPC ..................................................... 219/121.82
See application file for complete search history.

(56) References Cited

U.S. PATENT DOCUMENTS

| | | | |
|---|---|---|---|
| 10,512,965 B2 | 12/2019 | Propkop et al. | |
| 2008/0230524 A1* | 9/2008 | Merz ..................... | B23K 26/10 |
| | | | 219/121.72 |
| 2020/0023481 A1 | 1/2020 | Imboden | |
| 2021/0138589 A1 | 5/2021 | Bader | |

FOREIGN PATENT DOCUMENTS

| | | | |
|---|---|---|---|
| DE | 102014209811 B4 | 7/2016 | |
| DE | 202015009235 U1 | 12/2016 | |
| DE | 102017216828 A1 | 3/2019 | |
| DE | 102018203061 A1 | 9/2019 | |
| EP | 1836021 B1 | 9/2009 | |
| EP | 2441547 A1 | 4/2012 | |
| JP | H04258393 | * | 9/1992 |
| JP | H04258393 A | 9/1992 | |
| WO | 2006066430 A1 | 6/2006 | |
| WO | 2018073310 A2 | 4/2018 | |
| WO | 2018224697 A1 | 12/2018 | |

* cited by examiner

METHOD FOR TRANSPORTING WORKPIECE PARTS

FIELD AND BACKGROUND OF THE INVENTION

The present invention relates to a method for transporting workpiece parts from a cutting area of a laser cutting machine into a storage area, comprising: moving at least one first holding device for holding workpiece parts along a first guide in a transporting direction transverse to a direction of movement of a laser cutting head of the laser cutting machine, and moving at least one second holding device for holding workpiece parts along a second guide in the transporting direction transverse to the direction of movement of the laser cutting head.

On laser cutting installations in which the movement of the workpiece takes place in one direction and the movement of the cutting head takes place in a direction perpendicular thereto, such as are described for example in DE102014209811B4, DE102017216828B4 or DE102018203061, the cutting of workpiece parts and the transporting away of the workpiece parts may take place in alternation or at the same time, i.e. cut-free workpiece parts are transported out of the cutting area into the storage area before or while further workpiece parts are cut out of the workpiece (hereinafter also: workpiece panel).

The holding devices described in the aforementioned documents have holding means, which may for example be formed as suction pads, in order to hold cut-free workpiece parts and transport them away out of the cutting area of the laser cutting machine to a storage area. The holding devices may be attached individually or in groups to guides which run transversely in relation to the direction of movement of the laser cutting head or transversely in relation to a gap at which the cutting area is formed. The guides, for example in the form of guide rails, may in turn be attached to likewise movable beams, which can for example be moved along the direction of movement of the laser cutting head. In this way, the holding devices can in each case travel over part of the workpiece storage level without colliding with one another.

In the case of such laser cutting installations, when the workpiece panel is occupied with many relatively small workpiece parts (in particular without inner contours) which can be cut quickly, it can happen that, during the usual processing of the workpiece panel row by row, a holding device which is in the process of transporting one workpiece part to the storage area is not available again in time at the end of cutting the next workpiece part for removing or transporting the next cut-free workpiece part.

SUMMARY OF THE INVENTION

The invention is based on the object of providing a method which increases the speed of the removal or transport of workpiece parts on a laser cutting machine.

This object is achieved according to a first aspect of the invention by a method of the type mentioned at the beginning in which first workpiece parts, which are cut within the cutting area in a first half of a workpiece with respect to the direction of movement of the laser cutting head, are transported from the cutting area into the storage area by means of the at least one first holding device, in which second workpiece parts, which are cut within the cutting area in a second half of the workpiece with respect to the direction of movement of the laser cutting head, are transported from the cutting area into the storage area by means of the at least one second holding device and in which the transporting of a first workpiece part and a second workpiece part takes place in each case in alternation.

According to the first aspect of the invention, it is proposed to cut the workpiece parts out of the workpiece panel and transport them away with an optimized processing sequence. For this purpose, the workpiece panel is divided into two halves along a (virtual) central line, which runs perpendicularly in relation to the direction of movement of the laser cutting head, for being occupied with workpiece parts. The workpiece parts that are arranged and cut in the same half of the workpiece—with respect to the direction of movement of the laser cutting head—are transported by one or more of the holding devices that are arranged on or attached to the same guide. In this way, the first and second holding device(s) can each remove and transport (at least) one workpiece part out of the first or the second half respectively of the workpiece in alternation without hindering one another. If in the laser cutting installation there are holding devices on more than two guides, then for example the holding devices provided on two guides may (each on their own or together) transport workpiece parts from the one workpiece half and the holding devices of the third guide may transport workpiece parts from the second workpiece half.

Preferably, during the transporting of a first workpiece part by means of the at least one first holding device, a second workpiece part is cut (free) from the workpiece, and vice versa, i.e., during the transporting of a second workpiece part, a first workpiece part is cut (free) from the workpiece.

While a first workpiece part is being transported by a holding device or a group of holding devices away from the cutting area along a first guide, a second workpiece part can be cut free. In addition, the second workpiece part can be gripped or held and transported by a second holding device or a second group of holding devices of the second guide in the cutting area. In this way, the speed in the processing of the workpiece panel is increased significantly: the positioning of the holding devices can take place during the cutting time and the productivity of the laser cutting machine can be increased.

In the case of one variant, the alternating transporting of the first workpiece parts and the second workpiece parts takes place in each case from the lateral edge of the workpiece to the middle of the workpiece with respect to the direction of movement of the laser cutting head, or vice versa, i.e. from the middle of the workpiece to the outside. The alternating cutting and the alternating transport of the first and second workpiece parts take place in this case in a processing sequence from outside to inside or from inside to outside, i.e. the processing direction of the cutting and the transport of the first/second workpiece parts proceeds in opposite directions in the respective half of the workpiece. The direction of movement is established on the basis of two optimization objectives: on the one hand, as much distance between the holding devices that they are not in each other's way should be maintained; on the other hand, the positioning time of the laser head between two processing operations should be as small as possible.

In the case of an alternative variant, the transporting of the first workpiece parts takes place from a lateral first edge of the workpiece to the middle of the workpiece with respect to the direction of movement of the laser cutting head and the transporting of the second workpiece parts takes place from the middle of the workpiece to a lateral second edge of the workpiece with respect to the direction of movement of the laser cutting head, or vice versa. In this case, the processing direction in the two halves of the workpiece has the same orientation. In this way, the holding devices of the first and the second guide are always at a similar distance from one another, and consequently there is a low probability of them being in each other's way.

In the case of a further variant, the alternatingly transported first and second workpiece parts are arranged in a plurality of rows, which run parallel to the direction of movement of the laser cutting head. In this case, the workpiece parts are cut one after the other row by row and the alternating transport of the first and second workpiece parts likewise takes place row by row. The workpiece parts which are cut out of the workpiece may in this case be arranged on the workpiece in particular in a regular arrangement (matrix, raster) with multiple rows and multiple columns.

In the case of one development, a workpiece part which is cut in a respective row in the middle of the workpiece is transported as the first or last workpiece part of the respective row from the cutting area into the storage area. For the case where an uneven number of workpiece parts are intended to be cut in a row, in the middle of the workpiece there is typically a workpiece part which extends from the middle (the central line) into the first half and into the second half of the workpiece. Such a workpiece part therefore cannot be clearly assigned to one half of the workpiece and, during the processing operation on a respective row, is preferably cut and transported away first or last, since in this way short positioning times of the processing head and the holding devices are most simply achieved.

In the case of a further development, the last cut workpiece part of a first row is transported from the cutting area into the storage area by the first holding device and the last cut workpiece part of a second row, directly following the first row, is transported from the cutting area into the storage area by the second holding device, or vice versa. The last workpiece part is generally the workpiece part cut in the middle of the workpiece. This workpiece part, which extends into both halves of the workpiece, is in successive rows transported away alternately by the first holding device or the first group of holding devices and by the second holding device or the second group of holding devices. The other holding device respectively or the other group of holding devices respectively begins with the cutting of the first workpiece part in the next row. In particular in this case, it is favorable if the first cut workpiece part of the first row is a first workpiece part and the first cut workpiece part of the second row is a second workpiece part, or vice versa, i.e. if the sequence of the processing in the two rows following one another directly is switched over.

In the case of a further variant, the first workpiece parts are cut free at first cutting-free positions along their cutting contours and second workpiece parts are cut free at second cutting-free positions along their cutting contours, the first and second cutting-free positions being positioned on opposite sides of the respective cutting contours with respect to the direction of movement of the laser cutting head. In the case of this variant, not only the cutting free of the respective workpiece parts but also the initial cutting, i.e. the beginning of the cut, generally takes place on opposite sides of the respective cutting contours.

This procedure is advantageous in particular for the case where the holding devices or their holding means, for example in the form of suction pads, are already set down on the workpiece part before the cutting free, in order to stabilize ("prefix") its position. The cutting-free position should for this purpose lie on the side of the workpiece part that is facing away from the approach path of the holding device, in order that the holding device does not collide with the laser cutting head during the cutting free of the workpiece part. Since the approach path or the transporting path of the first and second holding devices from and to the storage area generally runs essentially mirror-symmetrically in relation to the central line of the workpiece, it is favorable if the cutting-free positions of the first and second workpiece parts are likewise arranged mirror-symmetrically in relation to the central line.

In the case of one development, the first and second cutting-free positions are located on a side of the respective cutting contours that is facing the middle of the workpiece. This is favorable if the respective depositing regions of the storage area for the first workpiece parts and for the second workpiece parts are arranged further outwards with respect to the central line of the workpiece than the respective workpiece parts to be transported. In this case, the approach path of the holding devices runs from outside to inside in the direction of movement of the cutting head, and so a collision of the holding devices with the laser cutting head can be avoided by such an arrangement of the cutting-free positions.

In the case of a further variant, the first workpiece parts are deposited on a first side of a depositing area of the storage area with respect to the middle of the workpiece and the second workpiece parts are deposited on a second side of a depositing area of the storage area with respect to the middle of the workpiece. In order to avoid collisions between the first holding devices and the second holding devices, the first workpiece parts, which are cut out of the first half of the workpiece, are deposited on the same side, i.e. the first side, of the depositing area with respect to the middle of the workpiece. Correspondingly, the second workpiece parts, which are cut out of the second half of the workpiece, are deposited on the second side of the depositing area. In this way it can be avoided that the first or second holding devices must cross the middle or the central line of the workpiece during the transport of the workpiece parts.

In the case of one variant, all of the first workpiece parts have the same geometry. In this way, the number of stacks of parts (of the same type) that are formed on a first side of a depositing area of the storage area can be reduced. It goes without saying that, correspondingly, all of the second workpiece parts may also have the same geometry, as a result of which the number of stacks of parts (of the same type) that are formed on a second side of a depositing area of the storage area can be reduced.

In the case of one development, all of the workpiece parts, i.e. both the first workpiece parts and the second workpiece parts, have the same geometry. In this case, the number of stacks of parts (of the same type) on the depositing area can be minimized.

In the case of a further variant, the first workpiece parts and the second workpiece parts have a different geometry. Workpiece parts which have a different geometry or are of a different type are preferably arranged on the workpiece such that one type of workpiece parts are in the first half of the workpiece and the second type of workpiece parts are in the second half of the workpiece. In this way, the storage area is better utilized, since a smaller number of stacks of parts can be formed on the depositing area.

In the case of a second aspect of the invention, which can in particular be combined with the first aspect of the invention, the method comprises: cutting a workpiece part along a first portion of a cutting contour while the at least one first holding device or the at least one second holding device is being moved in the transporting direction, and cutting the workpiece part along a second portion of the cutting contour before the cutting free of the workpiece part at a cutting-free position while the workpiece part is being held by the at least one first holding device or by the at least one second holding device.

In the case of this aspect of the invention, the cutting contour is divided into multiple portions in the programming system to further increase the processing speed for workpiece parts that are intended to be held by a holding device at the moment of cutting free. The first portion of the cutting contour, which preferably forms a large part of the cutting contour of the workpiece part, may in this case be cut while the transporting movement of the holding device(s) along the guide is still happening. Only in the case of the second portion, which forms a last segment of the cutting contour before the cutting-free position, does/do the holding device (s) have to be placed on the workpiece. In this way, waiting times can be reduced or avoided.

Further advantages of the invention are evident from the description and the drawing. Similarly, the features mentioned above and those still to be further presented can be used in each case individually or together in any desired combinations. The embodiments shown and described should not be understood as an exhaustive list, but rather as being of an exemplary character for the description of the invention.

In the following description of the drawings, identical reference signs are used for identical or functionally identical components.

DETAILED DESCRIPTION OF THE INVENTION

Figure 1:
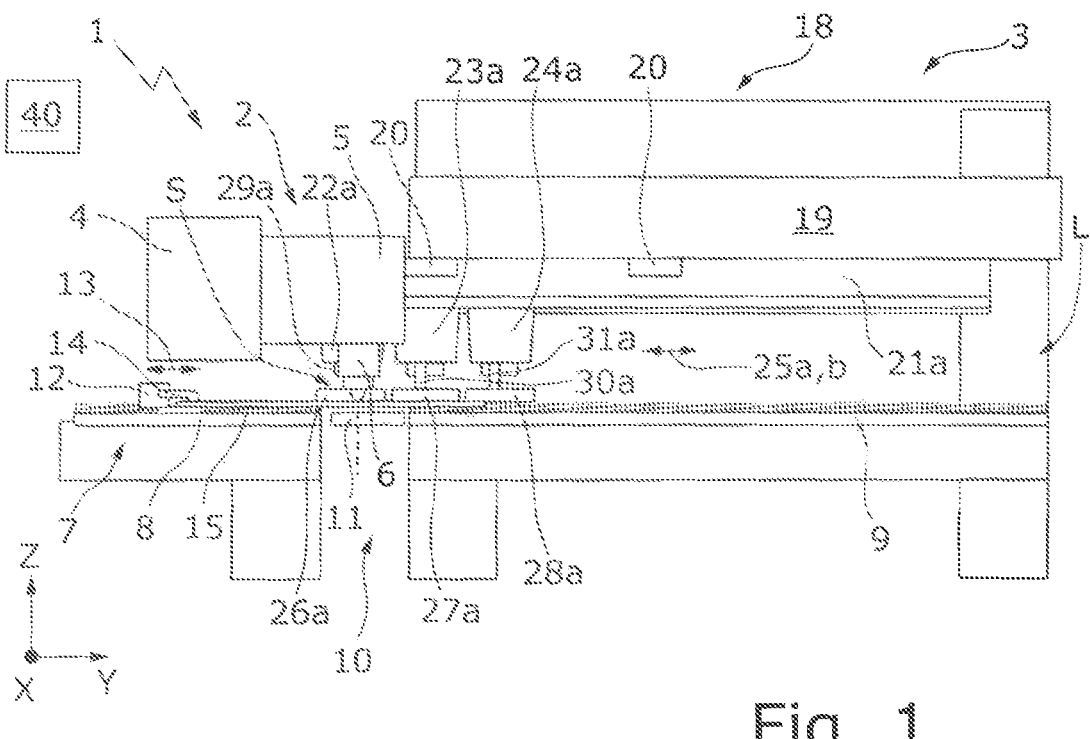
FIG. 1 shows a schematic representation of an example of a machine arrangement with a laser cutting machine and with a removal device for transporting workpiece parts.

FIG. 1 shows a machine arrangement 1, which has a laser cutting machine 2 and a device for transporting workpiece parts, which forms an unloading station 3 of the laser cutting machine 2. The laser cutting machine 2 shown here by way of example has a guiding structure, not graphically represented, with a portal cross-beam 4, along which a movement unit 5 with a laser cutting head 6 can be moved in a direction of movement perpendicular to the plane of the drawing of FIG. 1, which forms the X direction of an XYZ coordinate system. Furthermore, the laser cutting head 6 may perform movements in a vertical direction (Z direction) in relation to the portal cross-beam 4.

The portal cross-beam 4 spans a workpiece support 7, which on its upper side is provided with support brushes in a conventional way. The workpiece support 7 comprises a processing-side support table 8 and an unloading-side support table 9 in line with it in the horizontal direction. The processing-side support table 8 and the unloading-side support table 9 are separated by a support interspace 10 (gap), in which there is a suction-removal means, and/or one or more workpiece-supporting carriages 11 may be arranged movably in the X direction, perpendicular to the plane of the drawing.

On the processing-side support table 8, a cross-rail 12, extending in the X direction, i.e. perpendicular to the plane of the drawing, is guided in a motorized movable manner in the positive and the negative Y direction with the aid of a movement means 13 indicated by a double-headed arrow. The cross-rail 12 is provided with multiple clamping jaws 14, which are offset with respect to one another in the longitudinal direction of the cross-rail 12. The clamping jaws 14 hold a plate-like workpiece 15 before and during the cutting processing operation by means of the laser cutting head 6, the cutting processing operation on the workpiece 15 taking place in a cutting area S of the laser cutting machine 2 between the two support tables 8, 9. After the processing operation on the workpiece 15, and the accompanying separation of workpiece parts 16a, 16b (cf. FIG. 2) separated from the workpiece 15 and produced as a workpiece cut-out, the clamping jaws 14 hold a remaining workpiece that is created during the processing operation on the workpiece 15 in addition to the workpiece parts 16a, 16b and takes the form of a residual grid.

Figure 2:
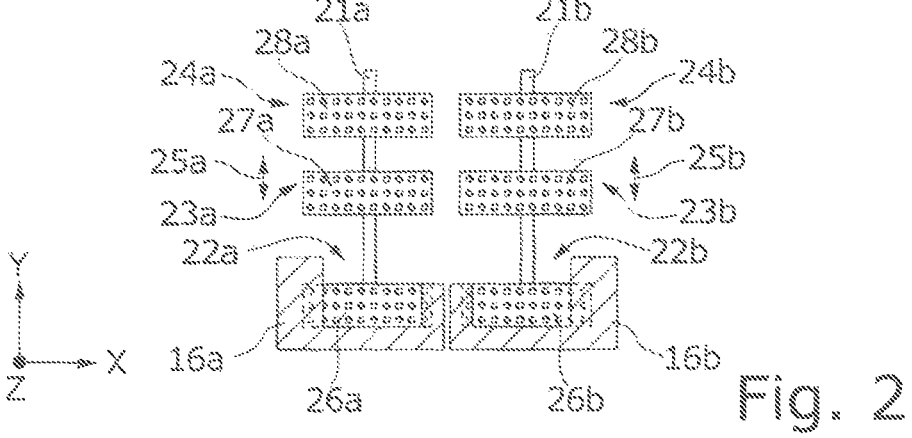
FIG. 2 shows a representation of two groups each with three holding devices, which are guided displaceably on a first and second guide rail, respectively, FIG. 3a,b show representations of a workpiece with a plurality of workpiece parts arranged in rows and columns and with a processing sequence for the first three rows of workpiece parts in each case.

The unloading station 3 comprises a framework 18, on which a horizontal beam 19 is mounted. Cantilever arms 20, which run perpendicularly in relation to the plane of the drawing, bear a first and a second guide in the form of a first and a second guide rail 21a, 21b (cf. also FIG. 2), running in the Y direction, during movements of the respective guide rail 21a, 21b along the cantilever arms 20 perpendicularly in relation to the plane of the drawing, i.e. in the X direction. As can be seen in FIG. 2, three first holding devices 22a, 23a, 24a can be moved along the first guide rail 21a with the aid of a first movement means 25a, indicated by a double-headed arrow, in the positive and the negative Y direction (transporting direction) over the workpiece support 7. Correspondingly, three second holding devices 22b, 23b, 24b can be moved along the second guide rail 21b with the aid of a second movement means 25b, independently of the three first holding devices 22a, 23a, 24a, in the positive and the negative Y direction over the workpiece support 7. The holding devices 22a,b, 23a,b, 24a,b can be moved or displaced along the transporting direction Y from the cutting area S into a storage area L, in order to transport workpiece parts 16a, 16b cut in the cutting area S into the storage area L. The storage area L may form part of the support table 9 and be arranged for example at the outer edge of the support table 9. Alternatively, the storage area L may be arranged next to the support table 9 and next to the framework 18 if the guide rails 21a, 21b are formed longer than is shown in FIG. 1 or are telescopically extendable.

The three first holding devices 22a, 23a, 24a each have a first holding means in the form of a first suction pad 26a, 27a, 28a. Correspondingly, the three second holding devices 22b, 23b, 24b each have a second holding means in the form of a second suction pad 26b, 27b, 28b. The three first and second holding means or suction pads 26a,b, 27a,b, 28a,b are of the same construction and can be displaced and adjusted in a vertical direction (Z direction) with the aid of in each case three first and second pneumatic piston-cylinder units 29a,b, 30a,b, 31a,b acting as adjusting drives. The holding means 26a,b, 27a,b, 28a,b in the form of the suction pads make it possible to hold workpiece parts 16a, 16b cut free from the workpiece 15, as is described for example in DE 10 2014 209 811 B4 cited at the beginning, which is incorporated by reference in its entirety in the content of this application.

A programmable numerical control means 40, schematically represented in FIG. 1, controls all of the essential functions both on the laser cutting machine 2 and on the unloading station 3 of the machine arrangement 1. Controlled in particular by the numerical control means 40 are the motorized drive 13 for the cross-rail 12 on the laser cutting machine 2, which also acts as a remaining-workpiece drive and is indicated by a double-headed arrow in FIG. 1, and the motorized movement means 25a,b for the three first and second holding devices 22a,b, 23a,b, 24a,b, which are likewise indicated by double-headed arrows in FIG. 2. In addition to the workpiece drive 13 and the movement means 25a,b for the three first and second holding devices 22a,b, 23a,b, 24a,b, also provided inter alia are further motorized drives, which are not represented for the sake of overall clarity and by means of which the horizontal movements of the guide rails 21a,b are performed, and for the control of which the numerical control means 40 of the machine arrangement 1 is likewise used.

Unlike as described further above, the numerical control means 40 may form part of the unloading station 3 or two separate numerical control means may be provided for the numerical control of the laser cutting machine 2 and the unloading station 3. The control programs for the programmable numerical control means 40 are generally generated with the aid of a programming system that runs on a separate computer. By means of the programming system, the orientation of the workpiece parts 16a,b within the workpiece 15 (nesting), the processing parameters for the cutting processing operation and the positioning of further machine components, such as for example the holding devices 22a,b, 23a,b, 24a,b, during and after the processing operation are established.

Shown in the representation of FIG. 2 are two workpiece parts 16a,b, which the laser cutting head 6 separates from the workpiece 15 shown in FIG. 1 in the cutting area S, which is formed between the two support tables 8, 9 of the workpiece support 7, by in each case a (final) separating cut and additionally creates the residual grid as a remaining workpiece. One or more of the first and second holding means in the form of the suction pads 26a,b, 27a,b, 28a,b attached to the extended piston rods of the pneumatic first and second piston-cylinder units 29a,b, 30a,b, 31a,b lie with their underside against the upper side of the respective workpiece part 16a,b, in order to hold it.

After the freeing of the first workpiece part 16a, the first movement means 25a is activated by the control means 40 for the movement of the first holding devices 22a, 23a, 24a, in order to transport the first workpiece part 16a by means of one or more of the suction pads 26a, 27a, 28a out of the cutting area S of the laser cutting machine 2 in the transporting direction Y along the first guide rail 21a into the storage area L. Correspondingly, after the freeing of the second workpiece part 16b, the second movement means 25b is activated by the control means 40 for the movement of the second holding devices 22b, 23b, 24b, in order to transport the second workpiece part 16b by means of one or more of the second suction pads 26b, 27b, 28b out of the cutting area S of the laser cutting machine 2 in the transporting direction Y along the second guide rail 21b into the storage area L.

The number of first and second suction pads 26a,b, 27a,b, 28a,b used for displacing depends on the size and shape of the first and the second workpiece part 16a,b. In the case of the example shown in FIG. 2, only one of the first/second suction pads 26a,b is required in each case for transporting the first/second workpiece part 16a,b.

To increase the speed of the transport or the removal of workpiece parts 16a,b from the cutting area S into the storage area L, first workpiece parts 16a, which are cut within the cutting area S in a first half 15a of the workpiece 15 (cf. FIG. 3a,b) with respect to the direction of movement X of the laser cutting head 6, are transported from the cutting area S into the storage area L by means of the first holding device(s) 22a, 23a, 24a, while second workpiece parts 16b, which are cut in a second half 15b of the workpiece 15 with respect to the direction of movement X of the laser cutting head 6, are transported from the cutting area S into the storage area L by means of the second holding device(s) 22b, 23b, 24b. The first half 15a and the second half 15b of the workpiece 15 are separated by an (imaginary) central line 32, which runs in the transporting direction Y and is referred to hereinafter as the middle 32 of the workpiece 15.

The transporting of the first workpiece parts 16a and the second workpiece parts 16b from the cutting area S into the storage area L and the cutting (free) of the first workpiece parts 16a and the second workpiece parts 16b in the cutting area S takes place in alternation. During the transporting of a first workpiece part 16a by means of the at least one first holding device 22a, 23a, 24a, a second workpiece part 16b is cut free here from the workpiece 15, and vice versa. In this way, the speed in the processing of the workpiece 15 is increased significantly: the positioning of the holding devices 22a,b, 23a,b, 24a,b can take place during the cutting time and the productivity of the laser cutting machine 2 can be increased.

Figures 3A, 3B, 4, 5:
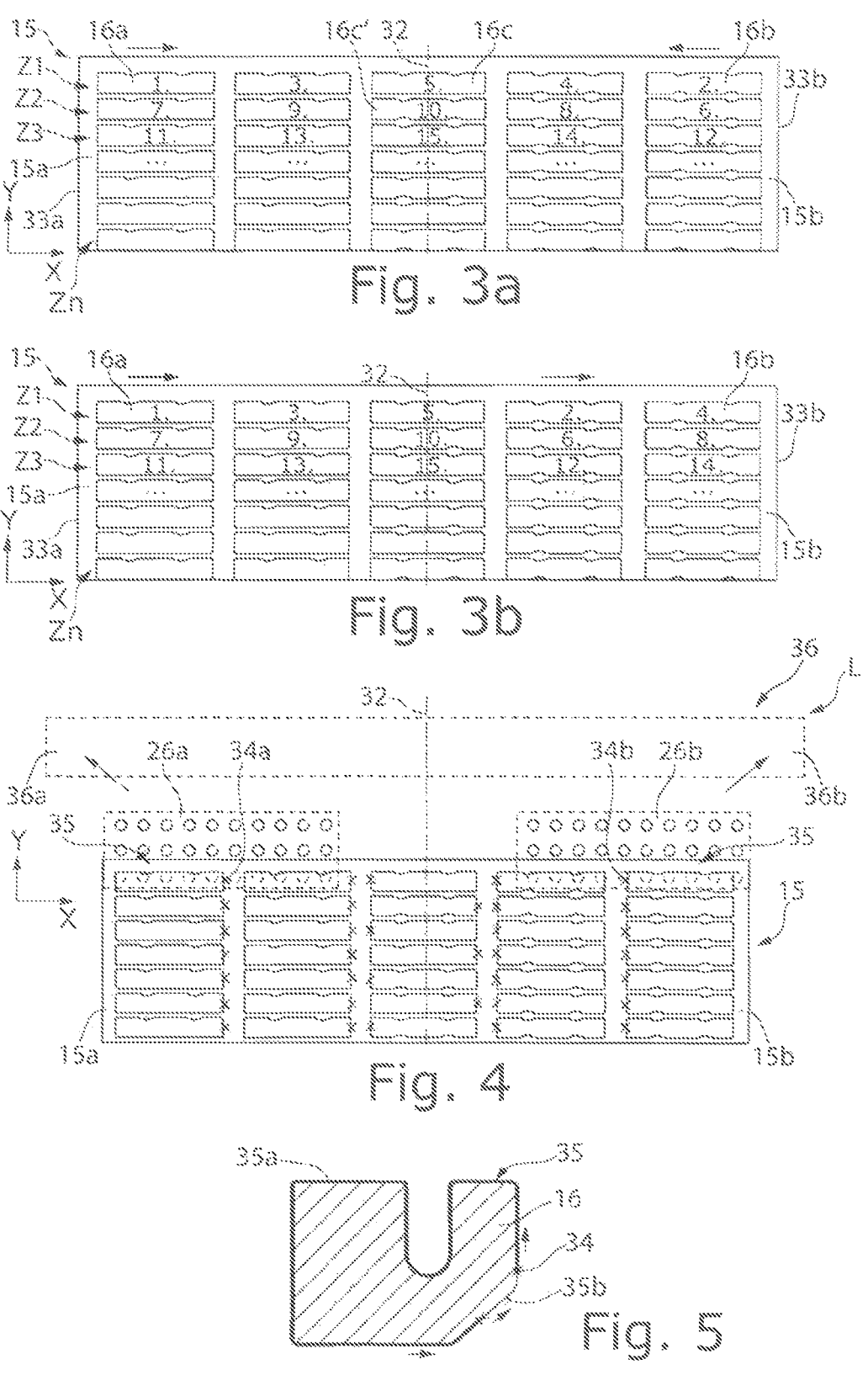
FIG. 4 shows a representation of the workpiece from FIG. 3a,b with cutting-free positions of the workpiece parts and with a storage area.
FIG. 5 shows a representation of a workpiece part of which the cutting contour is divided into a first portion and a second portion.

In the case of the example shown in FIG. 3a,b, the first and second workpiece parts 16a,b, which are cut out of the workpiece 15, are arranged in a regular arrangement with a number n of rows Z1, Z2, . . . , Zn, which extend parallel to the direction of movement X of the laser cutting head 6, and with a number of five columns, which extend in the transporting direction Y. The first workpiece parts 16a, arranged in the first two columns, are arranged completely in the first half 15a of the workpiece 15, the second workpiece parts 16b, arranged in the fourth and fifth columns, are arranged completely in the second half 15b of the workpiece 15. The middle 32 of the workpiece 15 runs through the workpiece parts 16c, 16c', arranged in the third, middle column, i.e. these workpiece parts 16c, 16c' are arranged partly in the first half 15a and partly in the second half 15b of the workpiece 15.

The cutting and the transporting of the workpiece parts 16a, 16b, 16c, 16c' takes place in a processing sequence, which is represented in FIG. 3a,b respectively for the first three rows Z1, Z2, Z3. The processing sequence of the first and second workpiece parts 16a,b of the first row Z1 from FIG. 3a is described below.

In FIG. 3a, the transporting and the cutting of the first and second workpiece parts 16a, 16b takes place respectively from a lateral first edge 33a and second edge 33b of the workpiece 15 with respect to the direction of movement X of the laser cutting head 6: in a first step, the first workpiece part 16a (number 1), arranged in the first column—adjacent to the first edge 33a of the workpiece 15—is cut and transported out of the cutting area S into the storage area L by means of the first holding device 22*a*. During the transport of the first workpiece part 16*a*, the second workpiece part 16*b* (number 2), arranged in the fifth column— adjacent to the second edge 33*b* of the workpiece 15—is cut by means of the laser cutting head 6. This second workpiece part 16*b* is subsequently transported out of the cutting area S into the storage area L by means of the second holding device 22*b*. Parallel to this, the first workpiece part 16*a* (number 3), arranged in the second column and closer to the middle 32 of the workpiece 15 than the first workpiece part 16*a* arranged in the first column, is cut. The first workpiece part 16*a*, arranged in the second column, is subsequently transported into the storage area L by means of the first holding device 22*a*, while in parallel the second workpiece part 16*b* (number 4), arranged in the fourth column, is cut. The second workpiece part 16*b*, arranged in the fourth column, is then transported into the storage area L by means of the second holding device 22*b*, while the workpiece part 16*c* (number 5), arranged in the third, middle column, is cut as the last workpiece part of the first row Z1. The last workpiece part 16*c* in the first row Z1 is subsequently transported into the storage area L by the first holding device 22*a* and the processing operation on the first row Z1 is complete.

In the case of the example shown in FIG. 3*b*, the transporting of the first workpiece parts 16*a* takes place from the first edge 33*a* of the workpiece 15 with respect to the direction of movement X of the laser cutting head 6 to the middle 32 of the workpiece 15, the transporting of the second workpiece parts 16*b* takes place however—unlike in FIG. 3*a*—from the middle 32 of the workpiece 15 to a second lateral edge 33*b* of the workpiece 15 with respect to the direction of movement X of the laser cutting head 6. The associated processing sequence is represented in FIG. 3*b*. As FIG. 3*b* reveals, in FIG. 3*b* the processing takes place in the same direction, i.e. in the same (positive) X direction, in both halves 15*a*, 15*b* of the workpiece 15, while in FIG. 3*a* the processing of the workpiece parts 16*a,b* takes place in opposite directions in the two halves 15*a*, 15*b*, as respectively indicated in FIG. 3*a,b* by arrows. It goes without saying that the processing operation in FIG. 3*b* can also take place in the (negative) X direction, i.e. the transporting of the first workpiece parts 16*a* may take place from the middle 32 of the workpiece 15 and the transporting of the second workpiece parts 16*b* may take place from the second lateral edge 33*b* of the workpiece 15.

As described further above in connection with FIG. 3*a,b*, the workpiece part 16*c* arranged in the middle 32 of the workpiece 15 is cut as the last workpiece part of the first row Z1 and is transported as the last workpiece part from the cutting area S into the storage area L, specifically by means of one of the first holding devices 22*a*, 23*a*, 24*a*. Correspondingly, the workpiece part 16*c'* arranged in the middle 32 of the workpiece 15, in the second row Z2, is also cut as the last workpiece part of the second row Z2. However, the last workpiece part 16*c'* of the second row Z2 is not transported from the cutting area S into the storage area L by one of the first holding devices 22*a*, 23*a*, 24*a* but by one of the second holding devices 22*b*, 23*b*, 24*b*. Correspondingly, also in the case of the further rows Z3, Zn, the middle workpiece part 16*c*, 16*c'* is cut as the last part. As in the case of the first row Z1 and the second row Z2, the transporting away of the last workpiece part 16*c*, 16*c'* in successively following rows $Z_i$, $Z_{i+1}$ takes place in each case in alternation by means of the first holding device(s) 22*a*, 23*a*, 24*a* or by means of the second holding device(s) 22*b*, 23*b*, 24*b*.

This is favorable for allowing the quickest possible processing or removal of parts. The other group respectively of holding devices 22*a,b*, 23*a,b*, 24*a,b* takes over here in each case the transporting away of the first or second workpiece part 16*a,b* which is cut as the first part in the respectively following rows.

As FIG. 4 reveals, the first workpiece parts 16*a* are cut free at first cutting-free positions 34*a* on a side of the respective cutting contours 35 that is facing the middle 32 of the workpiece 15, on the right in FIG. 4. Correspondingly, the second workpiece parts 16*b* are cut free at second cutting-free positions 34*b*, which are likewise on a side of the respective cutting contours 35 that is facing the middle 32 of the workpiece 15, on the left in FIG. 4. The first workpiece parts 16*a* and the second workpiece parts 16*b* are consequently cut free on sides of their respective cutting contours 35 that are opposite one another. This is favorable in particular for the case where the first holding means 26*a*, 27*a*, 28*a* or the second holding means 26*b*, 27*b*, 28*b* have already been set down on the respective workpiece part 16*a*, 16*b*, in order to stabilize its position in relation to the (remaining) workpiece 15, before the cutting free. The cutting-free positions 34*a*, 34*b* should be positioned here on the side facing the middle 32 of the (plate-shaped) workpiece 15, in order to prevent the laser cutting head 6 from colliding with the respective holding means 26*a,b*, 27*a,b*, 28*a,b* during the cutting free.

Moreover, the respective cutting-free position 34*a*, 34*b* should be arranged on a side facing away from the approach path or path of movement of the holding means 26*a,b*, 27*a,b*, 28*a,b*, or the holding devices 22*a,b*, 23*a,b*, 24*a,b* assigned to them, with respect to the direction of movement X of the laser cutting head 6. As indicated in FIG. 4 by two arrows, the transport of the first and second workpiece parts 16*a,b* does not just take place in the transporting direction Y, i.e. perpendicularly in relation to the direction of movement X of the laser cutting head 6, but rather the transporting movement also has a component along the X direction, which in each case is directed away from the middle 32 of the workpiece 15, i.e. in the negative X direction for the transport of the first workpiece parts 16*a* and in the positive X direction for the transport of the second workpiece parts 16*b*. For the movement of the first and second holding devices 22*a,b*, 23*a,b*, 24*a,b* in the X direction, the first and the second guide rail 21*a*, 21*b* is displaced on the cantilever arms 20 in the X direction by means of suitable motorized drives.

As FIG. 4 likewise reveals, the first workpiece parts 16*a* are deposited on a first side 36*a* of a depositing area 36 of the storage area L with respect to the middle 32 of the workpiece 15. Correspondingly, the second workpiece parts 16*b* are deposited on a second side 36*b* of a depositing area 36 of the storage area L with respect to the middle 32 of the workpiece 15. In this way, a collision between the first holding devices 22*a*, 23*a*, 24*a* and the second holding devices 22*b*, 23*b*, 24*b* during the transport of the first and second workpiece parts 16*a,b* from the cutting area S into the storage area L can be avoided.

As FIG. 3*a,b* and FIG. 4 likewise reveal, the first workpiece parts 16*a* and the second workpiece parts 16*b* have a different geometry. Thus, the space in the storage area L is optimally used, since the number of stacks of parts (of the same type) to be formed is in this way reduced. As FIG. 3*a,b* and FIG. 4 likewise reveal, the workpiece part 16*c* arranged in the first row Z1 in the middle 32 of the workpiece 15 has the same geometry as the first workpiece parts 16*a*. This is favorable in order that this workpiece part 16*c* can be transported by means of the first holding devices 22*a*, 23*a*, 24*a* into the storage area L and deposited there on the same stack as the first workpiece parts 16*a*. Correspondingly, the workpiece part 16*c*' arranged in the second row Z2 in the middle 32 of the workpiece 15 has a geometry which corresponds to that of the second workpiece parts 16*b*. This workpiece part 16*c*' can therefore be transported with the aid of the second holding devices 22*b*, 23*b*, 24*b* into the storage area L and deposited there on the same stack as the second workpiece parts 16*b*. What has been said above applies analogously to the workpiece parts 16*c*, 16*c*' arranged in the middle of the further rows Z3, . . . , Zn.

In order to increase the processing speed further, in the case of workpiece parts 16*a*, 16*b*, 16*c*, 16*c*', which are intended to be held by the first or second holding means 26*a*,*b*, 27*a*,*b*, 28*a*,*b* during or directly before the cutting free, the cutting contour 35 may be divided into multiple portions in the programming system or in the control means 40. FIG. 5 shows this procedure by way of example for a first workpiece part 16*a*, the cutting contour 35 of which has been divided into two portions 35*a*, 35*b*. In the case of the example shown in FIG. 5, the cutting of the first workpiece part 16*a* takes place along the first portion 35*a* of the cutting contour 35, while the at least one first holding device 22*a*, 23*a*, 24*a*, which is intended to hold the workpiece part 16*a* during the cutting free, is moved in the transporting direction Y into the cutting area S. Along a second portion 35*b* of the cutting contour 35, which begins at a position in the vicinity of the cutting-free position 34, the first workpiece part 16*a* is held by the first holding device 22*a*, 23*a*, 24*a*, to be more precise by the holding means 26*a*, 27*a*, 28*a* in the form of a suction pad, until the first workpiece part 16*a* is separated completely from the (remaining) workpiece 15 at the cutting-free position 34. It goes without saying that this procedure can be carried out analogously for the second workpiece parts 16*b*. In this case, the second holding devices 22*b*, 23*b*, 24*b* or their second holding means 26*b*, 27*b*, 28*b* serve for holding the second workpiece part 16*b* before the cutting free. An analogous procedure may also be followed for the workpiece parts 16*c*, 16*c*' in the middle 32 of the workpiece 15.

To sum up, in the way described further above, the overall processing time required for the cutting and for the removal or the transport of workpiece parts 16*a*,*b*, 16*c*, 16*c*' out of the cutting area S of the laser cutting installation 2 into a storage area L can be reduced, and thus the productivity of the machine arrangement 1 can be increased significantly.

The invention claimed is:

1. A method for transporting first and second workpiece parts that are cut from a workpiece out of a cutting area of a laser cutting machine into a storage area, the method comprising:

moving at least one first holding device for holding workpiece parts along a first guide in a transporting direction transverse to a direction of movement of a laser cutting head of the laser cutting machine;

transporting first workpiece parts, which are cut within the cutting area in a first half of the workpiece with respect to the direction of movement of the laser cutting head, from the cutting area into the storage area by the at least one first holding device;

moving at least one second holding device for holding workpiece parts along a second guide in the transporting direction transverse to the direction of movement of the laser cutting head;

transporting second workpiece parts, which are cut within the cutting area in a second half of the workpiece with respect to the direction of movement of the laser cutting head, from the cutting area into the storage area by the at least one second holding device;

transporting the first workpiece parts and the second workpiece parts into the storage area in alternation;

wherein the first and second workpiece parts to be transported in alternation are arranged in a plurality of rows, which run parallel to the direction of movement of the laser cutting head; and transporting a workpiece part which is cut in a respective row in the middle of the workpiece as a first or last workpiece part of the respective row from the cutting area into the storage area.

2. The method according to claim 1, which comprises, during the transporting of a first workpiece part of the first workpiece parts by the at least one first holding device, cutting a second workpiece part of the second workpiece parts free from the workpiece, and vice versa.

3. The method according to claim 1, which comprises transporting the first workpiece parts and the second workpiece parts in alternation from a lateral edge of the workpiece to a middle of the workpiece with respect to the direction of movement of the laser cutting head, or vice versa.

4. The method according to claim 1, which comprises transporting the first workpiece parts away from a lateral first edge of the workpiece to a middle of the workpiece with respect to the direction of movement of the laser cutting head, and then transporting the second workpiece parts away from the middle of the workpiece to a lateral second edge of the workpiece with respect to the direction of movement of the laser cutting head, or vice versa.

5. A method for transporting first and second workpiece parts that are cut from a workpiece out of a cutting area of a laser cutting machine into a storage area, the method comprising:

moving at least one first holding device for holding workpiece parts along a first guide in a transporting direction transverse to a direction of movement of a laser cutting head of the laser cutting machine;

transporting first workpiece parts, which are cut within the cutting area in a first half of the workpiece with respect to the direction of movement of the laser cutting head, from the cutting area into the storage area by the at least one first holding device;

moving at least one second holding device for holding workpiece parts along a second guide in the transporting direction transverse to the direction of movement of the laser cutting head;

transporting second workpiece parts, which are cut within the cutting area in a second half of the workpiece with respect to the direction of movement of the laser cutting head, from the cutting area into the storage area by the at least one second holding device;

transporting the first workpiece parts and the second workpiece parts into the storage area in alternation;

wherein the first and second workpiece parts to be transported in alternation are arranged in a plurality of rows, which run parallel to the direction of movement of the laser cutting head; and transporting a last cut workpiece part of a first row from the cutting area into the storage area by the at least one first holding device and transporting a last cut workpiece part of a second row, directly following the first row, from the cutting area into the storage area by the at least one second holding device, or vice versa.

6. The method according to claim 5, wherein the first workpiece parts are cut free at first cutting-free positions along cutting contours thereof and the second workpiece parts are cut free at second cutting-free positions along cutting contours thereof, the first and second cutting-free positions being positioned on opposite sides of the respective cutting contours with respect to the direction of movement of the laser cutting head.

7. The method according to claim 6, wherein each of the first and second cutting-free positions is located on a side of the respective cutting contour that is facing the middle of the workpiece.

8. The method according to claim 1, which comprises depositing the first workpiece parts on a first side of a depositing area of the storage area with respect to a middle of the workpiece and depositing the second workpiece parts on a second side of a depositing area of the storage area with respect to the middle of the workpiece.

9. The method according to claim 1, wherein all of the first workpiece parts have the same geometry.

10. The method according to claim 9, wherein all of the second workpiece parts have the same geometry.

11. The method according to claim 1, wherein the first workpiece parts have a different geometry from the second workpiece parts.

12. The method according to claim 1, further comprising:
cutting a respective first or second workpiece part along a first portion of a cutting contour while the at least one first holding device or the at least one second holding device is being moved in the transporting direction; and
cutting the respective first or second workpiece part along a second portion of the cutting contour prior to cutting free the respective first or second workpiece part at a cutting-free position while the workpiece part is being held by the at least one first holding device or by the at least one second holding device.

13. A method for transporting first and second workpiece parts that are cut from a workpiece out of a cutting area of a laser cutting machine into a storage area, the method comprising:
moving at least one first holding device for holding workpiece parts along a first guide in a transporting direction transverse to a direction of movement of a laser cutting head of the laser cutting machine;
transporting first workpiece parts, which are cut within the cutting area in a first half of the workpiece with respect to the direction of movement of the laser cutting head, from the cutting area into the storage area by the at least one first holding device;

moving at least one second holding device for holding workpiece parts along a second guide in the transporting direction transverse to the direction of movement of the laser cutting head;
transporting second workpiece parts, which are cut within the cutting area in a second half of the workpiece with respect to the direction of movement of the laser cutting head, from the cutting area into the storage area by the at least one second holding device; and
transporting the first workpiece parts and the second workpiece parts in alternation from a lateral edge of the workpiece to a middle of the workpiece with respect to the direction of movement of the laser cutting head, or vice versa.

14. A method for transporting first and second workpiece parts that are cut from a workpiece out of a cutting area of a laser cutting machine into a storage area, the method comprising:
moving at least one first holding device for holding workpiece parts along a first guide in a transporting direction transverse to a direction of movement of a laser cutting head of the laser cutting machine;
transporting first workpiece parts, which are cut within the cutting area in a first half of the workpiece with respect to the direction of movement of the laser cutting head, from the cutting area into the storage area by the at least one first holding device;
moving at least one second holding device for holding workpiece parts along a second guide in the transporting direction transverse to the direction of movement of the laser cutting head;
transporting second workpiece parts, which are cut within the cutting area in a second half of the workpiece with respect to the direction of movement of the laser cutting head, from the cutting area into the storage area by the at least one second holding device; and
transporting the first workpiece parts and the second workpiece parts into the storage area in alternation, and thereby transporting the first workpiece parts away from a lateral first edge of the workpiece to a middle of the workpiece with respect to the direction of movement of the laser cutting head, and then transporting the second workpiece parts away from the middle of the workpiece to a lateral second edge of the workpiece with respect to the direction of movement of the laser cutting head, or vice versa.

* * * * *